(12) United States Patent
Larson et al.

(10) Patent No.: US 8,694,735 B2
(45) Date of Patent: *Apr. 8, 2014

(54) APPARATUS AND METHOD FOR DATA BYPASS FOR A BI-DIRECTIONAL DATA BUS IN A HUB-BASED MEMORY SUB-SYSTEM

(75) Inventors: Douglas A. Larson, Lakeville, MN (US); Jeffrey J. Cronin, Andover, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/612,490

(22) Filed: Sep. 12, 2012

(65) Prior Publication Data

US 2013/0007384 A1    Jan. 3, 2013

Related U.S. Application Data

(63) Continuation of application No. 12/840,007, filed on Jul. 20, 2010, now Pat. No. 8,291,173, which is a continuation of application No. 10/773,583, filed on Feb. 5, 2004, now Pat. No. 7,788,451.

(51) Int. Cl.
    *G06F 12/00*        (2006.01)
(52) U.S. Cl.
    USPC .......................................................... 711/138
(58) Field of Classification Search
    None
    See application file for complete search history.

(56) References Cited

U.S. PATENT DOCUMENTS

| | | |
|---|---|---|
| 3,742,253 A | 6/1973 | Kronies |
| 4,045,781 A | 8/1977 | Levy et al. |
| 4,078,228 A | 3/1978 | Miyazaki |
| 4,240,143 A | 12/1980 | Besemer et al. |
| 4,245,306 A | 1/1981 | Besemer et al. |
| 4,253,144 A | 2/1981 | Bellamy et al. |
| 4,253,146 A | 2/1981 | Bellamy et al. |
| 4,608,702 A | 8/1986 | Hirzel et al. |

(Continued)

FOREIGN PATENT DOCUMENTS

| | | |
|---|---|---|
| EP | 0 709 786 A1 | 5/1996 |
| EP | 0849685 A2 | 6/1998 |

(Continued)

OTHER PUBLICATIONS

First Office action dated Jun. 27, 2012 for EP application No. 05 712 043.8.

(Continued)

*Primary Examiner* — Duc Doan
(74) *Attorney, Agent, or Firm* — Dorsey & Whitney LLP

(57) ABSTRACT

A memory hub includes first and second link interfaces for coupling to respective data busses, a data path coupled to the first and second link interfaces and through which data is transferred between the first and second link interfaces, and further includes a write bypass circuit coupled to the data path to couple write data on the data path and temporarily store the write data to allow read data to be transferred through the data path while the write data is temporarily stored. A method for writing data to a memory location in a memory system is provided which includes accessing read data in the memory system, providing write data to the memory system, and coupling the write data to a register for temporary storage. The write data is recoupled to the memory bus and written to the memory location following provision of the read data.

20 Claims, 3 Drawing Sheets

(56) References Cited

U.S. PATENT DOCUMENTS

| | | |
|---|---|---|
| 4,707,823 A | 11/1987 | Holdren et al. |
| 4,724,520 A | 2/1988 | Athanas et al. |
| 4,831,520 A | 5/1989 | Rubinfeld et al. |
| 4,843,263 A | 6/1989 | Ando |
| 4,891,808 A | 1/1990 | Williams |
| 4,930,128 A | 5/1990 | Suzuki et al. |
| 4,953,930 A | 9/1990 | Ramsey et al. |
| 4,982,185 A | 1/1991 | Holmberg et al. |
| 5,241,506 A | 8/1993 | Motegi et al. |
| 5,243,703 A | 9/1993 | Farmwald et al. |
| 5,251,303 A | 10/1993 | Fogg, Jr. et al. |
| 5,255,239 A * | 10/1993 | Taborn et al. ............... 365/221 |
| 5,269,022 A | 12/1993 | Shinjo et al. |
| 5,299,293 A | 3/1994 | Mestdagh et al. |
| 5,313,590 A | 5/1994 | Taylor |
| 5,317,752 A | 5/1994 | Jewett et al. |
| 5,319,755 A | 6/1994 | Farmwald et al. |
| 5,327,553 A | 7/1994 | Jewett et al. |
| 5,355,391 A | 10/1994 | Horowitz et al. |
| 5,432,823 A | 7/1995 | Gasbarro et al. |
| 5,432,907 A | 7/1995 | Picazo, Jr. et al. |
| 5,442,770 A | 8/1995 | Barratt |
| 5,461,627 A | 10/1995 | Rypinski |
| 5,465,229 A | 11/1995 | Bechtolsheim et al. |
| 5,467,455 A * | 11/1995 | Gay et al. ............... 710/100 |
| 5,479,370 A | 12/1995 | Furuyama et al. |
| 5,497,476 A | 3/1996 | Oldfield et al. |
| 5,502,621 A | 3/1996 | Schumacher et al. |
| 5,544,319 A | 8/1996 | Acton et al. |
| 5,566,325 A | 10/1996 | Bruce, II et al. |
| 5,577,220 A | 11/1996 | Combs et al. |
| 5,581,767 A | 12/1996 | Katsuki et al. |
| 5,606,717 A | 2/1997 | Farmwald et al. |
| 5,638,334 A | 6/1997 | Farmwald et al. |
| 5,638,534 A | 6/1997 | Mote, Jr. |
| 5,659,798 A | 8/1997 | Blumrich et al. |
| 5,687,325 A | 11/1997 | Chang |
| 5,706,224 A | 1/1998 | Srinivasan et al. |
| 5,715,456 A | 2/1998 | Bennett et al. |
| 5,729,709 A | 3/1998 | Harness |
| 5,748,616 A | 5/1998 | Riley |
| 5,799,048 A | 8/1998 | Farjad-Rad et al. |
| 5,818,844 A | 10/1998 | Singh et al. |
| 5,819,304 A | 10/1998 | Nilsen et al. |
| 5,822,255 A | 10/1998 | Uchida |
| 5,832,250 A | 11/1998 | Whittaker |
| 5,875,352 A | 2/1999 | Gentry et al. |
| 5,875,454 A | 2/1999 | Craft et al. |
| 5,900,020 A | 5/1999 | Safranek et al. |
| 5,928,343 A | 7/1999 | Farmwald et al. |
| 5,966,724 A | 10/1999 | Ryan |
| 5,973,935 A | 10/1999 | Schoenfeld et al. |
| 5,973,951 A | 10/1999 | Bechtolsheim et al. |
| 5,978,567 A | 11/1999 | Rebane et al. |
| 5,987,196 A | 11/1999 | Noble |
| 6,014,721 A | 1/2000 | Arimilli et al. |
| 6,023,726 A | 2/2000 | Saksena |
| 6,029,250 A | 2/2000 | Keeth |
| 6,031,241 A | 2/2000 | Silfvast et al. |
| 6,033,951 A | 3/2000 | Chao |
| 6,038,630 A | 3/2000 | Foster et al. |
| 6,038,687 A | 3/2000 | Ho |
| 6,061,263 A | 5/2000 | Boaz et al. |
| 6,061,296 A | 5/2000 | Ternullo, Jr. et al. |
| 6,064,706 A | 5/2000 | Driskill et al. |
| 6,067,262 A | 5/2000 | Irrinki et al. |
| 6,067,649 A | 5/2000 | Goodwin |
| 6,073,190 A | 6/2000 | Rooney |
| 6,076,139 A | 6/2000 | Welker et al. |
| 6,079,008 A | 6/2000 | Clery, III |
| 6,098,158 A | 8/2000 | Lay et al. |
| 6,100,735 A | 8/2000 | Lu |
| 6,105,075 A | 8/2000 | Ghaffari |
| 6,125,431 A | 9/2000 | Kobayashi |
| 6,131,149 A | 10/2000 | Lu et al. |
| 6,134,624 A | 10/2000 | Burns et al. |
| 6,137,709 A | 10/2000 | Boaz et al. |
| 6,144,587 A | 11/2000 | Yoshida |
| 6,167,465 A | 12/2000 | Parvin et al. |
| 6,167,486 A | 12/2000 | Lee et al. |
| 6,175,571 B1 | 1/2001 | Haddock et al. |
| 6,185,352 B1 | 2/2001 | Hurley |
| 6,186,400 B1 | 2/2001 | Dvorkis et al. |
| 6,191,663 B1 | 2/2001 | Hannah |
| 6,201,724 B1 | 3/2001 | Ishizaki et al. |
| 6,208,180 B1 | 3/2001 | Fisch et al. |
| 6,219,725 B1 | 4/2001 | Diehl et al. |
| 6,233,376 B1 | 5/2001 | Updegrove |
| 6,243,769 B1 | 6/2001 | Rooney |
| 6,243,831 B1 | 6/2001 | Mustafa et al. |
| 6,246,618 B1 | 6/2001 | Yamamoto et al. |
| 6,247,107 B1 | 6/2001 | Christie |
| 6,249,802 B1 | 6/2001 | Richardson et al. |
| 6,256,325 B1 | 7/2001 | Park |
| 6,256,692 B1 | 7/2001 | Yoda et al. |
| 6,272,600 B1 | 8/2001 | Talbot et al. |
| 6,272,609 B1 | 8/2001 | Jeddeloh |
| 6,278,755 B1 | 8/2001 | Baba et al. |
| 6,285,349 B1 | 9/2001 | Smith |
| 6,286,083 B1 | 9/2001 | Chin et al. |
| 6,289,068 B1 | 9/2001 | Hassoun et al. |
| 6,294,937 B1 | 9/2001 | Crafts et al. |
| 6,301,637 B1 | 10/2001 | Krull et al. |
| 6,324,485 B1 | 11/2001 | Ellis |
| 6,327,642 B1 | 12/2001 | Lee et al. |
| 6,327,650 B1 | 12/2001 | Bapst et al. |
| 6,330,205 B2 | 12/2001 | Shimizu et al. |
| 6,347,055 B1 | 2/2002 | Motomura |
| 6,349,363 B2 | 2/2002 | Cai et al. |
| 6,356,573 B1 | 3/2002 | Jonsson et al. |
| 6,367,074 B1 | 4/2002 | Bates et al. |
| 6,370,068 B2 | 4/2002 | Rhee |
| 6,373,777 B1 | 4/2002 | Suzuki |
| 6,381,190 B1 | 4/2002 | Shinkai |
| 6,392,653 B1 | 5/2002 | Malandain et al. |
| 6,401,213 B1 | 6/2002 | Jeddeloh |
| 6,405,280 B1 | 6/2002 | Ryan |
| 6,421,744 B1 | 7/2002 | Morrison et al. |
| 6,430,696 B1 | 8/2002 | Keeth |
| 6,434,639 B1 | 8/2002 | Haghighi |
| 6,434,696 B1 | 8/2002 | Kang |
| 6,434,736 B1 | 8/2002 | Schaecher et al. |
| 6,438,622 B1 | 8/2002 | Haghighi et al. |
| 6,438,668 B1 | 8/2002 | Esfahani et al. |
| 6,449,308 B1 | 9/2002 | Knight, Jr. et al. |
| 6,453,370 B1 | 9/2002 | Stracovsky et al. |
| 6,453,393 B1 | 9/2002 | Holman et al. |
| 6,462,978 B2 | 10/2002 | Shibata et al. |
| 6,463,059 B1 | 10/2002 | Movshovich et al. |
| 6,467,013 B1 | 10/2002 | Nizar |
| 6,470,422 B2 | 10/2002 | Cai et al. |
| 6,473,828 B1 | 10/2002 | Matsui |
| 6,477,592 B1 | 11/2002 | Chen et al. |
| 6,477,614 B1 | 11/2002 | Leddige et al. |
| 6,477,621 B1 | 11/2002 | Lee et al. |
| 6,479,322 B2 | 11/2002 | Kawata et al. |
| 6,487,556 B1 | 11/2002 | Downs et al. |
| 6,490,188 B2 | 12/2002 | Nuxoll et al. |
| 6,493,803 B1 | 12/2002 | Pham et al. |
| 6,496,909 B1 | 12/2002 | Schimmel |
| 6,501,471 B1 | 12/2002 | Venkataraman et al. |
| 6,505,287 B2 | 1/2003 | Uematsu |
| 6,523,092 B1 | 2/2003 | Fanning |
| 6,523,093 B1 | 2/2003 | Bogin et al. |
| 6,526,483 B1 | 2/2003 | Cho et al. |
| 6,539,490 B1 | 3/2003 | Forbes et al. |
| 6,552,564 B1 | 4/2003 | Forbes et al. |
| 6,564,329 B1 | 5/2003 | Cheung et al. |
| 6,577,174 B2 | 6/2003 | Locker et al. |
| 6,587,912 B2 | 7/2003 | Leddige et al. |
| 6,590,816 B2 | 7/2003 | Perner |
| 6,594,713 B1 | 7/2003 | Fuoco et al. |
| 6,594,722 B1 | 7/2003 | Willke, II et al. |
| 6,598,154 B1 | 7/2003 | Vaid et al. |

(56) References Cited

U.S. PATENT DOCUMENTS

| | | | |
|---|---|---|---|
| 6,615,325 B2 | 9/2003 | Mailloux et al. |
| 6,622,186 B1 | 9/2003 | Moniot et al. |
| 6,622,188 B1 | 9/2003 | Goodwin et al. |
| 6,622,227 B2 | 9/2003 | Zumkehr et al. |
| 6,625,687 B1 | 9/2003 | Halbert et al. |
| 6,628,294 B1 | 9/2003 | Sadowsky et al. |
| 6,629,220 B1 | 9/2003 | Dyer |
| 6,631,440 B2 | 10/2003 | Jenne et al. |
| 6,633,576 B1 | 10/2003 | Melaragni et al. |
| 6,636,110 B1 | 10/2003 | Ooishi et al. |
| 6,636,912 B2 | 10/2003 | Ajanovic et al. |
| 6,646,929 B1 | 11/2003 | Moss et al. |
| 6,658,509 B1 | 12/2003 | Bonella et al. |
| 6,662,304 B2 | 12/2003 | Keeth et al. |
| 6,665,202 B2 | 12/2003 | Lindahl et al. |
| 6,667,895 B2 | 12/2003 | Jang et al. |
| 6,667,926 B1 | 12/2003 | Chen et al. |
| 6,670,833 B2 | 12/2003 | Kurd et al. |
| 6,681,292 B2 | 1/2004 | Creta et al. |
| 6,697,926 B2 | 2/2004 | Johnson et al. |
| 6,715,018 B2 | 3/2004 | Farnworth et al. |
| 6,718,440 B2 | 4/2004 | Maiyuran et al. |
| 6,721,195 B2 | 4/2004 | Brunelle et al. |
| 6,721,860 B2 | 4/2004 | Klein |
| 6,724,685 B2 | 4/2004 | Braun et al. |
| 6,728,800 B1 | 4/2004 | Lee et al. |
| 6,735,679 B1 | 5/2004 | Herbst et al. |
| 6,735,682 B2 | 5/2004 | Segelken et al. |
| 6,742,098 B1 | 5/2004 | Halbert et al. |
| 6,745,275 B2 | 6/2004 | Chang |
| 6,751,703 B2 | 6/2004 | Chilton |
| 6,754,812 B1 | 6/2004 | Abdallah et al. |
| 6,756,661 B2 | 6/2004 | Tsuneda et al. |
| 6,760,833 B1 | 7/2004 | Dowling |
| 6,771,538 B2 | 8/2004 | Shukuri et al. |
| 6,775,747 B2 | 8/2004 | Venkatraman |
| 6,782,435 B2* | 8/2004 | Garcia et al. ............ 710/33 |
| 6,789,173 B1 | 9/2004 | Tanaka et al. |
| 6,792,059 B2 | 9/2004 | Yuan et al. |
| 6,792,496 B2 | 9/2004 | Aboulenein et al. |
| 6,795,899 B2 | 9/2004 | Dodd et al. |
| 6,799,246 B1 | 9/2004 | Wise et al. |
| 6,799,268 B1 | 9/2004 | Boggs et al. |
| 6,804,760 B2 | 10/2004 | Wiliams |
| 6,804,764 B2 | 10/2004 | Laberge et al. |
| 6,807,630 B2 | 10/2004 | Lay et al. |
| 6,811,320 B1 | 11/2004 | Abbott |
| 6,816,947 B1 | 11/2004 | Huffman |
| 6,820,181 B2 | 11/2004 | Jeddeloh et al. |
| 6,821,029 B1 | 11/2004 | Grung et al. |
| 6,823,023 B1 | 11/2004 | Hannah |
| 6,845,409 B1 | 1/2005 | Talagala et al. |
| 6,877,079 B2 | 4/2005 | Yoo et al. |
| 6,889,304 B2 | 5/2005 | Perego et al. |
| 6,901,494 B2 | 5/2005 | Zumkehr et al. |
| 6,904,556 B2 | 6/2005 | Walton et al. |
| 6,910,109 B2 | 6/2005 | Holman et al. |
| 6,912,612 B2 | 6/2005 | Kapur et al. |
| 6,947,672 B2 | 9/2005 | Jiang et al. |
| 6,980,042 B2 | 12/2005 | LaBerge |
| 7,046,060 B1 | 5/2006 | Minzoni et al. |
| 7,047,351 B2 | 5/2006 | Jeddeloh |
| 7,068,085 B2 | 6/2006 | Gomm et al. |
| 7,107,399 B2 | 9/2006 | Bilardi et al. |
| 7,116,143 B2 | 10/2006 | Deivasigamani et al. |
| 7,117,316 B2 | 10/2006 | Jeddeloh |
| 7,120,743 B2 | 10/2006 | Meyer et al. |
| 7,133,991 B2 | 11/2006 | James |
| 7,136,958 B2 | 11/2006 | Jeddeloh |
| 7,149,874 B2 | 12/2006 | Jeddeloh |
| 7,181,584 B2 | 2/2007 | LaBerge |
| 7,187,742 B1 | 3/2007 | Logue et al. |
| 7,251,714 B2 | 7/2007 | James |
| 7,257,683 B2 | 8/2007 | Jeddeloh et al. |
| 7,363,419 B2 | 4/2008 | Cronin et al. |
| 7,386,649 B2 | 6/2008 | Jeddeloh |
| 7,412,571 B2 | 8/2008 | Jeddeloh et al. |
| 7,412,574 B2 | 8/2008 | Jeddeloh |
| 7,415,567 B2 | 8/2008 | Jeddeloh |
| 7,421,525 B2 | 9/2008 | Polzin et al. |
| 7,447,240 B2 | 11/2008 | James |
| 7,469,316 B2* | 12/2008 | Dodd ............ 711/118 |
| 7,529,273 B2 | 5/2009 | James |
| 7,768,325 B2 | 8/2010 | Milton |
| 7,788,451 B2 | 8/2010 | Larson et al. |
| 8,082,404 B2 | 12/2011 | Jeddeloh et al. |
| 8,291,173 B2 | 10/2012 | Larson et al. |
| 2001/0038611 A1 | 11/2001 | Darcie et al. |
| 2001/0039612 A1 | 11/2001 | Lee |
| 2002/0016885 A1 | 2/2002 | Ryan et al. |
| 2002/0084458 A1 | 7/2002 | Halbert et al. |
| 2002/0112119 A1 | 8/2002 | Halbert et al. |
| 2002/0116588 A1 | 8/2002 | Beckert et al. |
| 2002/0144064 A1 | 10/2002 | Fanning |
| 2002/0174284 A1 | 11/2002 | Garcia et al. |
| 2002/0196806 A1 | 12/2002 | Ghodrat et al. |
| 2003/0005223 A1 | 1/2003 | Coulson et al. |
| 2003/0005344 A1 | 1/2003 | Bhamidipati et al. |
| 2003/0043158 A1 | 3/2003 | Wasserman et al. |
| 2003/0043426 A1 | 3/2003 | Baker et al. |
| 2003/0093630 A1 | 5/2003 | Richard et al. |
| 2003/0149809 A1 | 8/2003 | Jensen et al. |
| 2003/0156581 A1 | 8/2003 | Osborne |
| 2003/0163649 A1 | 8/2003 | Kapur et al. |
| 2003/0177320 A1 | 9/2003 | Sah et al. |
| 2003/0193927 A1 | 10/2003 | Hronik |
| 2003/0200401 A1 | 10/2003 | Moriwaki et al. |
| 2003/0217223 A1 | 11/2003 | Nino, Jr. et al. |
| 2003/0227798 A1 | 12/2003 | Pax |
| 2003/0229762 A1 | 12/2003 | Maiyuran et al. |
| 2003/0229770 A1 | 12/2003 | Jeddeloh |
| 2004/0015650 A1 | 1/2004 | Zumkehr et al. |
| 2004/0022094 A1 | 2/2004 | Radhakrishnan et al. |
| 2004/0024948 A1 | 2/2004 | Winkler et al. |
| 2004/0034753 A1 | 2/2004 | Jeddeloh |
| 2004/0044833 A1 | 3/2004 | Ryan |
| 2004/0044857 A1 | 3/2004 | Jeddeloh et al. |
| 2004/0047169 A1 | 3/2004 | Lee et al. |
| 2004/0107306 A1 | 6/2004 | Barth et al. |
| 2004/0126115 A1 | 7/2004 | Levy et al. |
| 2004/0128449 A1 | 7/2004 | Osborne et al. |
| 2004/0144994 A1 | 7/2004 | Lee et al. |
| 2004/0160206 A1 | 8/2004 | Komaki et al. |
| 2004/0193821 A1 | 9/2004 | Ruhovets et al. |
| 2004/0199739 A1 | 10/2004 | Jeddeloh |
| 2004/0225847 A1 | 11/2004 | Wastlick et al. |
| 2004/0230718 A1 | 11/2004 | Polzin et al. |
| 2004/0236885 A1 | 11/2004 | Fredriksson et al. |
| 2004/0251936 A1 | 12/2004 | Gomm |
| 2005/0015426 A1 | 1/2005 | Woodruff et al. |
| 2005/0044327 A1 | 2/2005 | Howard et al. |
| 2005/0071542 A1 | 3/2005 | Weber et al. |
| 2005/0086441 A1 | 4/2005 | Meyer et al. |
| 2005/0105350 A1* | 5/2005 | Zimmerman ............ 365/201 |
| 2005/0122153 A1 | 6/2005 | Lin |
| 2005/0132159 A1 | 6/2005 | Jeddeloh |
| 2005/0149603 A1 | 7/2005 | DeSota et al. |
| 2005/0162882 A1 | 7/2005 | Reeves et al. |
| 2005/0166006 A1 | 7/2005 | Talbot et al. |
| 2005/0169168 A1 | 8/2005 | Aronson et al. |
| 2005/0177677 A1 | 8/2005 | Jeddeloh |
| 2005/0177695 A1 | 8/2005 | Larson et al. |
| 2005/0213611 A1 | 9/2005 | James |
| 2005/0268060 A1 | 12/2005 | Cronin et al. |
| 2006/0022724 A1 | 2/2006 | Zerbe et al. |
| 2006/0066375 A1 | 3/2006 | Laberge |
| 2006/0136683 A1 | 6/2006 | Meyer et al. |
| 2006/0174070 A1 | 8/2006 | Jeddeloh |
| 2006/0218318 A1 | 9/2006 | James |
| 2006/0271746 A1 | 11/2006 | Meyer et al. |
| 2007/0033317 A1 | 2/2007 | Jeddeloh |
| 2007/0180171 A1 | 8/2007 | Jeddeloh |
| 2007/0300023 A1 | 12/2007 | Cronin et al. |
| 2008/0215792 A1 | 9/2008 | Jeddeloh |

(56) References Cited

U.S. PATENT DOCUMENTS

| | | |
|---|---|---|
| 2008/0294862 A1 | 11/2008 | Jeddeloh |
| 2009/0013211 A1 | 1/2009 | Vogt et al. |
| 2010/0019822 A1 | 1/2010 | LaBerge |
| 2010/0287323 A1 | 11/2010 | Larson |
| 2012/0066461 A1 | 3/2012 | Jeddeloh et al. |

FOREIGN PATENT DOCUMENTS

| | | |
|---|---|---|
| EP | 0910021 | 4/1999 |
| EP | 0910021 A1 | 4/1999 |
| JP | 06-104707 | 4/1994 |
| JP | 2001-161912 | 6/2001 |
| JP | 2001-265539 | 9/2001 |
| JP | 2008-023267 | 2/2008 |
| TW | 498215 | 8/2002 |
| TW | 502174 | 9/2002 |
| TW | 548547 | 8/2003 |
| WO | WO-93/19422 | 9/1993 |
| WO | WO-00/29921 | 5/2000 |
| WO | 02/23353 | 3/2002 |
| WO | WO-02/23353 | 3/2002 |
| WO | WO-02/27499 A2 | 4/2002 |
| WO | WO 2004/021129 A2 | 3/2004 |
| WO | WO-2004/102403 A2 | 11/2004 |
| WO | WO-2005/076816 A2 | 8/2005 |

OTHER PUBLICATIONS

"First Office Action of the People's Republic of China", Patent Application Filing No. 200580010700.8; dated Jan. 20, 2009.
"International Search Report and Written Opinion", International Application No. PCT/US2005/02410; International Filing Date Jan. 25, 2005.
"Offical Notice of Rejection", Japanese Patent Application No. 2006-0552147; mailed Mar. 23, 2010.
"Office Action of the IPO", Taiwan Patent Application No. 094104058; issued Mar. 4, 2009.
"Office Action of the IPO", Taiwan Patent Application No. 094104058; May 30, 2008.
"Response to Office Action of the IPO", Taiwan Patent Application No. 094104058; filed May 2009.
"Response to Taiwan Office Action", Taiwan Patent Application No. 094104058; filed Nov. 2008.
"Second Office Action of the People's Republic of China", Patent Application Filing No. 200580010700.8; dated Apr. 17, 2009.
"Supplemental European Search Report", Application No. 05712043.8; mailed Oct. 29, 2009.
"HyperTransport I/O Link Specification", HyperTransport Technology Consortium, 2001, pp. 46-49.
"Office Action mailed Sep. 7, 2010 for European Application No. 05728609.8".
Rambus, Inc. "Direct RambusTM Technology Disclosure", 1-16, 1997.
First Office Action dated Jan. 22, 2013 for EP application No. 05 712 043.8.
Extended search report received for EP 12 194 174.4 dated Feb. 8, 2013.
First Office Action of the People's Republic of China, Patent Application Filing No. 200580010700.8; dated Jan. 20, 2009.
International Search Report and Written Opinion, International Application No. PCT/US2005/02410; International Filing Date Jan. 25, 2005.
Offical Notice of Rejection, Japanese Patent Application No. 2006-0552148; mailed Mar. 23, 2010.
Office Action of the IPO, Taiwan Patent Application No. 094104058; issued Mar. 4, 2009.
Office Action of the IPO, Taiwan Patent Application No. 094104058; May 30, 2008.
Response to Office Action of the IPO, Taiwan Patent Application No. 094104058; filed May 2009.
Response to Taiwan Office Action, Taiwan Patent Application No. 094104058; filed Nov. 2008.
Second Office Action of the People's Republic of China, Patent Application Filing No. 200580010700.8; dated Apr. 17, 2009.
Supplemental European Search Report, Application No. 05712043.8; mailed Oct. 29, 2009.
HyperTransport I/O Link Specification, HyperTransport Technology Consortium, 2001, pp. 46-49.
Office Action mailed Sep. 7, 2010 for European Application No. 05728609.8.
Cronin, Jeffrey J. et al., First Office action dated Jan. 22, 2013 for EP application No. 05 712 043.8.
Larson, Douglas A. et al., Extended search report received for EP 12 194 174.4 dated Feb. 8, 2013.
Rambus, Inc, "Direct RambusTM Technology Disclosure", 1-16, Oct. 1997.
EP Office Action for Appl. No. 05712043.8 dated Sep. 27, 2013.
"Flash Erasable Programmable Read-Only Memory", "Free On-Line Dictionary of Computing". Online May 17, 2004 [http://foldoc.doc.ic.ac.uk/foldoc/foldoc.cgi?flaxh+memory].
"Micron 1Gb: x4, x8, x18 DDR SDRAM", Micron Technology, Inc, Jul. 2003.
Intel., "Flash Memory PCT Add-In Card for Embedded Systems", Application Note AP-758, Sep. 1997, Sep. 1997, pp. 1-13.
Intel, "Intel 840 Chipset: 82840 Memory Controller Hub (MCH)", Datasheet, www.intel.com/design/chipsets/datashts/298020.htm, Oct. 1999, pp. 1-178.
Micron Technology, Inc., "Synchronous DRAM Module 512MB/1GB (x72, ECC) 168-PIN Registered FBGA SDRAM DIMM", Micron Technology, Inc., 2002, pp. 1-23.
Shanley, T et al., "PCI System Architecture", Third Edition, Mindshare, Inc., 1995, Jul. 1996, 24-25.

* cited by examiner

APPARATUS AND METHOD FOR DATA BYPASS FOR A BI-DIRECTIONAL DATA BUS IN A HUB-BASED MEMORY SUB-SYSTEM

CROSS-REFERENCE TO RELATED APPLICATION(S)

This application is a continuation of U.S. patent application Ser. No. 12/840,007, filed Jul. 20, 2010, and issued as U.S. Pat. No. 8,291,173 on Oct. 16, 2012, which is a continuation of U.S. patent application Ser. No. 10/773,583, filed Feb. 5, 2004, and issued as U.S. Pat. No. 7,788,451. These applications and patents are incorporated herein by reference, in their entirety, for any purpose.

TECHNICAL FIELD

The present invention relates to memory systems, and more particularly, to memory modules having a data bypass for preventing data collision on a bi-direction data bus.

BACKGROUND

Computer systems use memory devices, such as dynamic random access memory ("DRAM") devices, to store data that are accessed by a processor. These memory devices are normally used as system memory in a computer system. In a typical computer system, the processor communicates with the system memory through a processor bus and a memory controller. The memory devices of the system memory, typically arranged in memory modules having multiple memory devices, are coupled through a memory bus to the memory controller. The processor issues a memory request, which includes a memory command, such as a read command, and an address designating the location from which data or instructions are to be read. The memory controller uses the command and address to generate appropriate command signals as well as row and column addresses, which are applied to the system memory through the memory bus. In response to the commands and addresses, data are transferred between the system memory and the processor. The memory controller is often part of a system controller, which also includes bus bridge circuitry for coupling the processor bus to an expansion bus, such as a PCI bus.

In memory systems, high data bandwidth is desirable. Generally, bandwidth limitations are not related to the memory controllers since the memory controllers sequence data to and from the system memory as fast as the memory devices allow. One approach that has been taken to increase bandwidth is to increase the speed of the memory data bus coupling the memory controller to the memory devices. Thus, the same amount of information can be moved over the memory data bus in less time. However, despite increasing memory data bus speeds, a corresponding increase in bandwidth does not result. One reason for the non-linear relationship between data bus speed and bandwidth is the hardware limitations within the memory devices themselves. That is, the memory controller has to schedule all memory commands to the memory devices such that the hardware limitations are honored. Although these hardware limitations can be reduced to some degree through the design of the memory device, a compromise must be made because reducing the hardware limitations typically adds cost, power, and/or size to the memory devices, all of which are undesirable alternatives. Thus, given these constraints, although it is easy for memory devices to move "well-behaved" traffic at ever increasing rates, for example, sequel traffic to the same page of a memory device, it is much more difficult for the memory devices to resolve "badly-behaved traffic," such as bouncing between different pages or banks of the memory device. As a result, the increase in memory data bus bandwidth does not yield a corresponding increase in information bandwidth.

In addition to the limited bandwidth between processors and memory devices, the performance of computer systems is also limited by latency problems that increase the time required to read data from system memory devices. More specifically, when a memory device read command is coupled to a system memory device, such as a synchronous DRAM ("SDRAM") device, the read data are output from the SDRAM device only after a delay of several clock periods. Therefore, although SDRAM devices can synchronously output burst data at a high data rate, the delay in initially providing the data can significantly slow the operating speed of a computer system using such SDRAM devices. Increasing the memory data bus speed can be used to help alleviate the latency issue. However, as with bandwidth, the increase in memory data bus speeds do not yield a linear reduction of latency, for essentially the same reasons previously discussed.

Although increasing memory data bus speed has, to some degree, been successful in increasing bandwidth and reducing latency, other issues are raised by this approach. For example, as the speed of the memory data bus increases, loading on the memory bus needs to be decreased in order to maintain signal integrity since traditionally, there has only been wire between the memory controller and the memory slots into which the memory modules are plugged. Several approaches have been taken to accommodate the increase in memory data bus speed. For example, reducing the number of memory slots, adding buffer circuits on a memory module in order to provide sufficient fanout of control signals to the memory devices on the memory module, and providing multiple memory device interfaces on the memory module since there are too few memory module connectors on a single memory device interface. The effectiveness of these conventional approaches are, however, limited. A reason why these techniques were used in the past is that it was cost-effective to do so. However, when only one memory module can be plugged in per interface, it becomes too costly to add a separate memory interface for each required memory slot. In other words, it pushes the system controllers package out of the commodity range and into the boutique range, thereby, greatly adding cost.

One recent approach that allows for increased memory data bus speed in a cost effective manner is the use of multiple memory devices coupled to the processor through a memory hub. In a memory hub architecture, or a hub-based memory sub-system, a system controller or memory controller is coupled over a high speed bi-directional or unidirectional memory controller/hub interface to several memory modules. Typically, the memory modules are coupled in a point-to-point or daisy chain architecture such that the memory modules are connected one to another in series. Thus, the memory controller is coupled to a first memory module, with the first memory module connected to a second memory module, and the second memory module coupled to a third memory module, and so on in a daisy chain fashion.

Each memory module includes a memory hub that is coupled to the memory controller/hub interface and a number of memory devices on the module, with the memory hubs efficiently routing memory requests and responses between the controller and the memory devices over the memory controller/hub interface. Computer systems employing this architecture can use a high-speed memory data bus since signal integrity can be maintained on the memory data bus. Moreover, this architecture also provides for easy expansion of the system memory without concern for degradation in signal quality as more memory modules are added, such as occurs in conventional memory bus architectures.

Although computer systems using memory hubs may provide superior performance, they may often fail to operate at optimum efficiency for a variety of reasons. One such reason is the issue of managing data collision between data flowing to and from the memory controller through the memory hubs. In conventional memory controllers, one approach taken to avoid data collision is to delay the execution of one memory command until the completion of another memory command. For example, with a conventional memory controller, a write command issued after a read command is not allowed to begin until the read command is nearly completed in order to avoid the read (i.e., inbound) data colliding with the write (i.e., outbound) data on the memory bus. However, forcing the write command to wait effectively reduces bandwidth, which is inconsistent with what is typically desired in a memory system.

SUMMARY

One aspect of the present invention is directed to a memory hub having a data bypass circuit. The memory hub includes first and second link interfaces for coupling to respective data busses, a data path coupled to the first and second link interfaces and through which data is transferred between the first and second link interfaces. The memory hub further includes a write bypass circuit coupled to the data path for coupling write data on the data path and temporarily storing the write data to allow read data to be transferred through the data path while the write data is temporarily stored. In another aspect of the invention, a method for writing data to a memory location in a memory system coupled to a memory bus is provided. The method includes accessing read data in the memory system, providing write data to the memory system on the memory bus, and coupling the write data to a register for temporary storage of the write data. While the data is temporarily stored, the read data is coupled from the memory bus and provided for reading. The write data is recoupled to the memory bus and written to the memory location.

DETAILED DESCRIPTION OF THE INVENTION

Embodiments of the present invention are directed to a memory hub having bypass circuitry that provides data bypass for a bi-directional data bus in a hub-based memory sub-system. Certain details are set forth below to provide a sufficient understanding of various embodiments of the invention. However, it will be clear to one skilled in the art that the invention may be practiced without these particular details. In other instances, well-known circuits, control signals, and timing protocols have not been shown in detail in order to avoid unnecessarily obscuring the invention.

Figure 1:
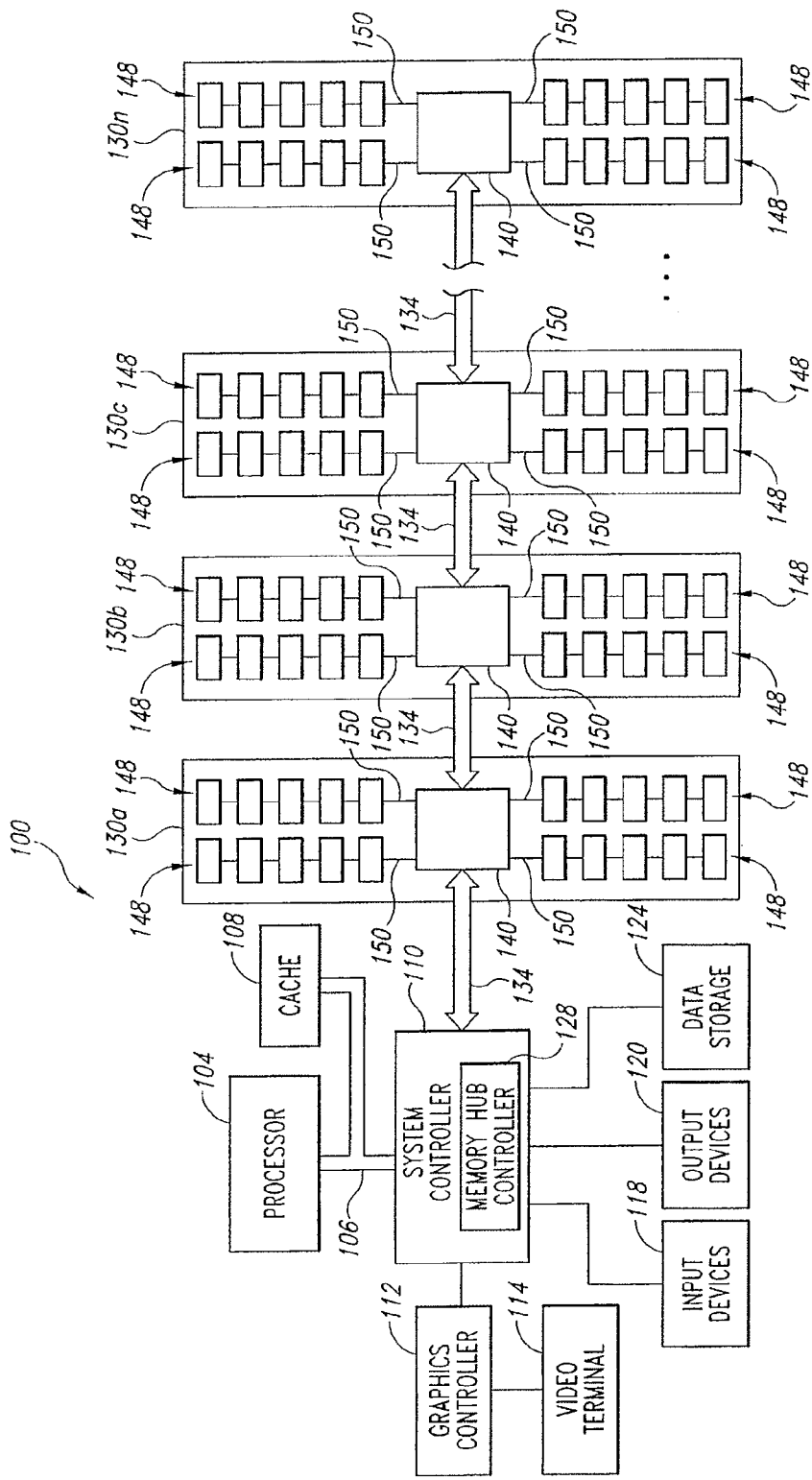
FIG. 1 is a block diagram of a computer system having memory modules in a memory hub architecture in which embodiments of the present invention can be implemented.

FIG. 1 illustrates a computer system 100 according to one embodiment of the present invention. The computer system 100 includes a processor 104 for performing various computing functions, such as executing specific software to perform specific calculations or tasks. The processor 104 includes a processor bus 106 that normally includes an address bus, a control bus, and a data bus. The processor bus 106 is typically coupled to cache memory 108. Typically, the cache memory 108 is provided by a static random access memory ("SRAM"). The processor bus 106 is also coupled to a system controller 110, which is sometimes referred to as a bus bridge.

The system controller 110 serves as a communications path to the processor 104 for a variety of other components. For example, as shown in FIG. 1, the system controller 110 includes a graphics port that is typically coupled to a graphics controller 112. The graphics controller is typically coupled to a video terminal 114, such as a video display. The system controller 110 is also coupled to one or more input devices 118, such as a keyboard or a mouse, to allow an operator to interface with the computer system 100. Typically, the computer system 100 also includes one or more output devices 120, such as a printer, coupled to the processor 104 through the system controller 110. One or more data storage devices 124 are also typically coupled to the processor 104 through the system controller 110 to allow the processor 104 to store data or retrieve data from internal or external storage media (not shown). Examples of typical storage devices 124 include hard and floppy disks, tape cassettes, and compact disk read-only memories (CD-ROMs).

The system controller 110 includes a memory hub controller 128 that is coupled to memory hubs 140 of several memory modules 130a, 130b, 130c, . . . 130n. The memory modules 130 serve as system memory for the computer system 100, and are preferably coupled to the memory hub controller 128 through a high-speed bi-directional memory controller/hub interface 134. The memory modules 130 are shown coupled to the memory hub controller 128 in a point-to-point arrangement in which the memory controller/hub interface 134 is coupled through the memory hubs 140 of the memory modules 130. That is, the memory controller/hub interface 134 is a bi-directional bus that couples the memory hubs 140 in series. Thus, information on the memory controller/hub interface 134 must travel through the memory hubs 140 of "upstream" memory modules 130 to reach a "downstream" destination. For example, with specific reference to FIG. 1, information transmitted from the memory hub controller 128 to the memory hub 140 of the memory module 130c will pass through the memory hubs 140 of the memory modules 130a and 130b.

It will be appreciated, however, that topologies other than the point-to-point arrangement of FIG. 1 may also be used. For example, a coupling arrangement may be used in which a separate high-speed link (not shown) is used to couple each of the memory modules 130 to the memory hub controller 128. A switching topology may also be used in which the memory hub controller 128 is selectively coupled to each of the memory modules 130 through a switch (not shown). Other topologies that may be used will be apparent to one skilled in the art. Additionally, the memory controller/hub interface 134 coupling the memory modules to the memory hub controller may be an electrical or optical communication path. However, other types of communications paths can be used for the memory controller/hub interface 134 as well. In the event the memory controller/hub interface 134 is implemented as an optical communication path, the optical communication path may be in the form of one or more optical fibers. In such case, the memory hub controller 128 and the memory modules will include an optical input/output port or separate input and output ports coupled to the optical communication path, as well known in the art.

The memory hubs 140 control access to memory devices 148 of the respective memory module 130. In FIG. 1, the memory devices are illustrated as synchronous dynamic random access memory ("SDRAM") devices. However, memory devices other than SDRAM devices may also be used. As also shown in FIG. 1, the memory hub is coupled to four sets of memory devices 148 through a respective memory bus 150. Each of the sets includes four memory devices 148 for a total of 20 memory devices 148 for each memory module 130. The memory busses 150 normally include a control bus, an address bus, and a data bus, as known in the art. However, it will be appreciated by those ordinarily skilled in the art that other bus systems, such as a bus system using a shared command/address bus, may also be used without departing from the scope of the present invention. It will be further appreciated that the arrangement of the memory devices 148, and the number of memory devices 148 can be modified without departing from the scope of the present invention.

Figure 2:
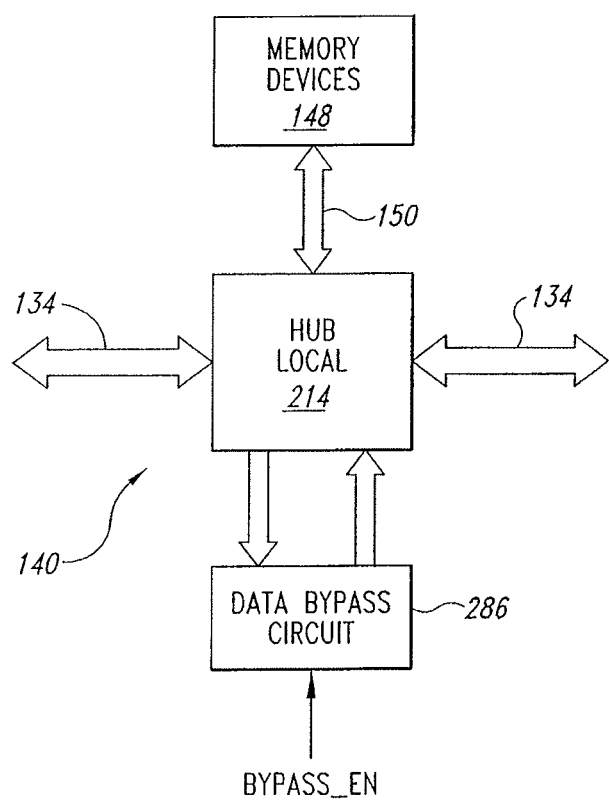
FIG. 2 is a partial block diagram of a memory hub according to an embodiment of the present invention for use with the memory modules of FIG. 1.

FIG. 2 illustrates a portion of the memory hub 140 according to an embodiment of the present invention. The memory hub 140 includes a local hub circuit 214 coupled to the memory controller/hub interface 134 (FIG. 1). The local hub circuit 214 is further coupled to memory devices 148 through the memory bus 150. The local hub circuit 214 includes control logic for processing memory commands issued from the memory controller 128 and for accessing the memory devices 148 over the memory bus 150 to provide the corresponding data when the memory command is directed to the respective memory module 130. The design and operation of such control logic is well known by those ordinarily skilled in the art, and consequently, a more detailed description has been omitted from herein in the interest of brevity. The memory hub 140 further includes a data bypass circuit 286 coupled to the local hub circuit 214. As will be explained in more detail below, the data bypass circuit 286 is used to temporarily capture data passing to a distant memory hub, which allows data returning from another distant memory hub to pass through the memory hub 140 before the captured data continues onto the distant memory hub. Thus, the data bypass circuit 286 provides a data bypass mechanism that can be used to avoid data collisions on the bi-directional memory controller/hub interface 134 to which the memory hub 140 is coupled.

As previously discussed, one approach taken by conventional memory sub-systems to avoid data collision is to delay the execution of one memory command until the completion of another memory command. For example, in typical memory systems a write command issued after a read command would not have been allowed to start until near the completion of the read command in order to avoid the read (i.e., inbound) data colliding with the write (i.e., outbound) data on the memory controller/hub interface 134. In contrast, by employing the memory hub 140 having the data bypass circuit 286, write commands issued after a read command can be sequenced earlier than compared with conventional memory systems, and consequently, memory commands scheduled after the earlier scheduled write command can be executed sooner as well.

Figure 3:
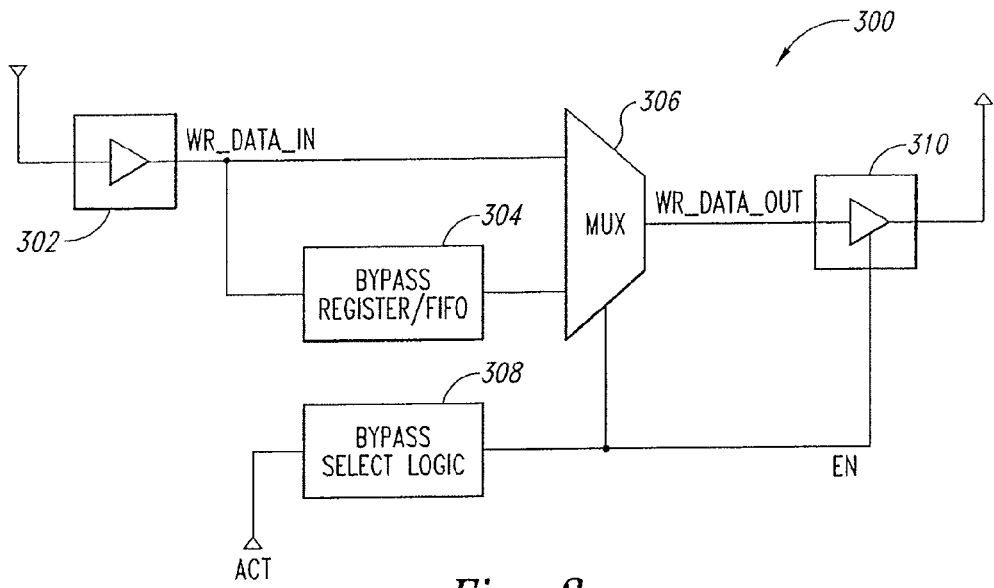
FIG. 3 is a block diagram of a data bypass circuit for the memory hub of FIG. 2 according to an embodiment of the present invention.

FIG. 3 illustrates a data bypass circuit 300 according to an embodiment of the present invention. The data bypass circuit 300 can be substituted for the data bypass circuit 286 (FIG. 2) and can be implemented using conventional designs and circuits well known to those ordinarily skilled in the art. The data bypass circuit 300 includes an input buffer 302 that receives input write data WR-DATA_IN and provides the same to a bypass register/FIFO 304 and a first input of a multiplexer 306. An output of the bypass register/FIFO 304 is coupled to a second input of the multiplexer 306. Selection of which of the two inputs to couple to the output of the multiplexer 306 is made by an enable signal EN generated by a bypass select logic 308. The EN signal is also provided to an input/output buffer 310 as an output enable signal activating or deactivating the input/output buffer 310. The bypass select logic 308 generates the appropriate EN signal in response to an activation signal BYPASS_EN provided by the memory hub controller 128 (FIG. 1). Alternatively, the BYPASS_EN signal may be provided from other memory hubs (not shown) that are part of the same memory system. The circuitry of the data bypass circuit is conventional, and it will be appreciated that the circuits of the data bypass circuit 300 can be implemented using conventional designs and circuitry well known in the art.

In operation, WR_DATA_IN received by the data bypass circuit 300 is driven through the input buffer 302 and is provided to the first input of the multiplexer 306. The WR_DATA_IN is also saved in the bypass register/FIFO 304. In response to an inactive BYPASS_EN signal, an active EN signal is generated by the bypass select logic 308. The active EN signal enables output by the input/output buffer 310 and couples the output of the input buffer 302 to the input of the input/output buffer 310 through the multiplexer 306. As a result, the WR_DATA_IN is provided directly to the input of the input/output buffer 310 and the WR_DATA_IN is provided through the data bypass circuit 300 without any bypass. However, in response to an active BYPASS_EN signal, the bypass select logic 308 generates an inactive EN signal, disabling the output function of the input/output buffer 310 and placing its output in a high-impedance state. Additionally, the inactive EN signal couples the input of the input/output buffer 310 to the output of the bypass register/FIFO 304. In this manner, the WR_DATA_IN is received by the data bypass circuit 300, stored by the bypass register/FIFO 304, and applied to the input of the input/output buffer 310. However, due to the inactive state of the EN signal, the WR_DATA_IN is not provided as output data WR_DATA_OUT by the input/output buffer 310. As a result, the WR_DATA_IN is held in a bypass state until the BYPASS_EN signal becomes inactive, at which time, the EN signal become active again, enabling the input/output buffer 310 to provide the WR_DATA_IN as WR_DATA_OUT data. The multiplexer 306 is also switched back to coupling the output of the input buffer 302 directly to the input of the input/output buffer 310 to allow WR_DATA_IN to pass through the data bypass circuit unhindered.

Figure 4:
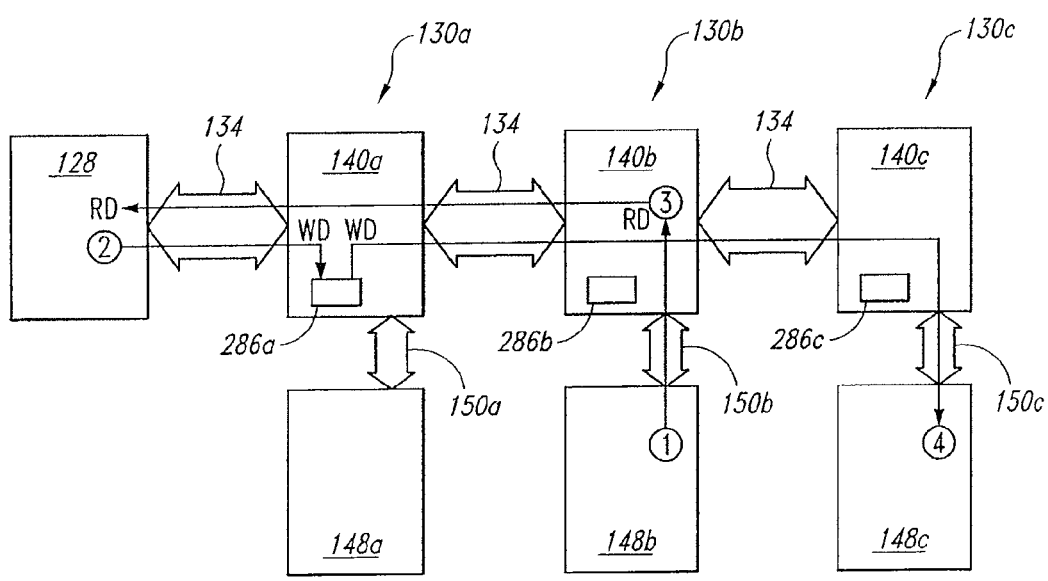
FIG. 4 is a block diagram illustrating the operation of the data bypass circuit of FIG. 3 for a computer system having the memory hub architecture of FIG. 1 and the memory hub of FIG. 2.

Operation of the data bypass circuit 286 will be described with reference to FIG. 4. FIG. 4 is similar to FIG. 1, except that FIG. 4 has been simplified. In particular, many of the functional blocks of FIG. 1 have been omitted, with only the memory modules 130a-130c being shown, and represented by memory hubs 140a-140c. Only one memory device 148a-148c is shown to be coupled to a respective memory hub 140a-140c through a respective memory bus 150a-150c. As with FIG. 1, the memory hubs 140a-140c are coupled by a high-speed bi-directional memory controller/hub interface 134 to a memory hub controller 128.

In FIG. 4, it is assumed that the memory hub controller 128 has just issued read and write commands, with the read command sequenced prior to the write command. The read command is directed to the memory module 130b and the write command is directed to the memory module 130c. That is, the memory module to which data will be written is further downstream than the memory module from which data is read. In response to the read command, the memory hub 140b begins retrieving the read data (RD) from the memory device 148b, as indicated in FIG. 4 by the "(1)". With the read command issued, the write command is then initiated, and the write data (WD) is provided onto the memory controller/hub interface 134. However, since the memory hub controller 128 is expecting the RD to be returned from the memory module 130b, the memory hub 140a is directed to capture the WD in its data bypass circuit 286a. As a result, the data bypass circuit 286a captures the WD to clear the memory controller/hub interface 134, as indicated in FIG. 4 by the "(2)", for the RD to be returned to the memory hub controller 128. When the memory hub 140b has retrieved the RD from the memory device 148b, the RD is then provided to the memory hub controller 128 through the memory controller/hub interface 134, as indicated in FIG. 4 by the "(3)" to complete the read request. Upon the RD passing through the memory hub 140a on its way to the memory hub controller 128, the memory hub 140a releases the WD from the data bypass circuit 286a to continue its way to the memory hub 140c. The WD is provided to the memory hub 140c through the high-speed link, which is now clear between the memory hub 140a and 140c. Upon reaching the memory hub 140c, the WD is written in the memory device 148c, as shown in FIG. 4 by the "(4)".

In an embodiment of the present invention, coordination of the data flow of the RD and WD on the memory controller/hub interface 134 and through the data bypass circuits 286 is under the control of the memory hub controller 128. For example, in the previous example the memory hub controller ensures that any WD flowing in the opposite direction of the RD is out of the way when retrieving RD from the memory module 130b. It will be appreciated, however, that in alternative embodiments data flow through the memory controller/hub interface 134 and the data bypass circuits 286 can be managed differently, such as the memory hub controller 128 sharing coordination of the data flow with the memory hubs 140.

In the previous example, the RD is returned to the memory hub controller 128 as in a conventional memory system. That is, the RD transmitted by the memory devices 148 is provided to the memory controller without any significant delay. However, by employing the previously described data bypass mechanism, write commands can be scheduled earlier than with conventional memory systems. A write command issued after a read command would not have been allowed to start until near the completion of the read command in typical memory systems. In contrast, embodiments of the present invention allow a subsequently issued write command to be scheduled earlier, thus, reducing the time gap between read and write commands. As a result, commands scheduled behind an earlier scheduled write command have an overall reduced latency.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method of managing read and write data transmission in a memory logic circuit, comprising:
  enabling a write data bypass circuit of a first memory to decouple and store write data from a bidirectional bus responsive, at least in part, to receipt of a read command and transmission of the read command to a second memory further downstream on the bidirectional bus and issuance of a write command; and
  restoring the write data to the bidirectional data bus with the write data bypass circuit of the first memory responsive, at least in part, to read data associated with the read command passing upstream on the bidirectional data bus.

2. The method of claim 1, wherein said enabling a write data bypass circuit comprises:
  enabling the write data bypass circuit responsive, at least in part, to receipt of an active bypass control signal from a memory controller.

3. The method of claim 1, wherein said restoring the write data to the bidirectional data bus comprises:
  enabling an output of a buffer; and
  providing the write data from the buffer to the bidirectional data bus.

4. The method of claim 1, wherein the write data comprises a first set of write data, the method further comprising:
  providing a second set of write data without any bypass.

5. The method of claim 1, wherein write data is stored in a data bypass register.

6. The method of claim 1, wherein the write command is issued by a memory controller.

7. A method, comprising:
  decoupling write data associated with a first memory module from a bidirectional data bus with a data bypass circuit of a second memory module when an enable control signal has a first state;
  after decoupling the write data from a bidirectional data bus with the data bypass circuit of the second memory module, storing the write data in a data bypass register of the data bypass circuit;
  restoring the write data to the bidirectional data bus responsive, at least in part, to the enable control signal switching from the first state to a second state.

8. The method of claim 7, wherein the enable control signal is provided by a bypass select control logic.

9. The method of claim 7, wherein said decoupling write data associated with a first memory module from the bidirectional data bus comprises:
  placing an output of a buffer in a high impedance state; and
  coupling an output of the data bypass register to an input of the buffer.

10. The method of claim 7, wherein the write data is a first set of write data, the method further comprising:
  providing a second set of write data without any bypass when the bypass control signal has the second state.

11. The method of claim 7, wherein the enable control signal has the first state when read data is on the bidirectional data bus.

12. The method of claim 7, wherein restoring the write data to the bidirectional data bus comprises:
  coupling an output of an input buffer to an input of an output buffer.

13. A method, comprising:
  receiving, with a memory module, a read command on a bidirectional data bus from an upstream device;
  providing, with the memory module, the read command to a first downstream memory module;

decoupling, with the memory module, write data from the bidirectional data bus and storing the write data, wherein the write data corresponds to a write command issued to a second downstream memory module;

receiving read data corresponding to the read command from the first downstream memory module;

providing the read data to the upstream device; and responsive to providing the read data to the upstream device, restoring the write data to the bidirectional data bus to provide the write data to the second downstream memory module.

14. The method of claim 13, wherein the first downstream memory module and the second downstream memory module are configured in a point-to-point arrangement.

15. The method of claim 13, wherein said decoupling write data from the bidirectional data bus and storing the write data comprises:

decoupling the write data from a first interface of the data bypass circuit; and wherein said restoring the write data to the bidirectional data bus comprises:

providing the write data to a second interface of the data bypass circuit.

16. The method of claim 15, wherein said providing the write data to the second interface comprises:

enabling an output of a buffer; and providing the write data from the buffer to the bidirectional data bus.

17. The method of claim 13, wherein storing the write data comprises storing the write data in a bypass register.

18. The method of claim 13, wherein said restoring the write data to the bidirectional data bus comprises:

switching the state of a control signal provided to a multiplexer.

19. The method of claim 13, wherein said decoupling write data from the bidirectional data bus and storing the write data comprises:

decoupling the write data from the bidirectional data bus and storing the write data responsive, at least in part, to receipt of an active bypass control signal.

20. The method of claim 13, wherein the upstream device comprises a memory controller.

* * * * *